United States Patent [19]

Drake

[11] Patent Number: 4,627,106

[45] Date of Patent: Dec. 2, 1986

[54] COMMUNICATIONS SYSTEM

[76] Inventor: Hugh H. Drake, P.O. Box 727, Fort Collins, Colo. 80522

[21] Appl. No.: 651,258

[22] Filed: Sep. 17, 1984

[51] Int. Cl.[4] ............................................. H04B 9/00
[52] U.S. Cl. .................................... 455/617; 455/609
[58] Field of Search .............. 455/604, 605, 606, 607, 455/609, 617; 354/401, 403; 356/5

[56] References Cited

U.S. PATENT DOCUMENTS

| | | | |
|---|---|---|---|
| 3,424,906 | 1/1969 | Korpel | 250/199 |
| 3,431,504 | 3/1969 | Adler | 329/129 |
| 3,514,534 | 5/1970 | Korpel | 178/7.5 |
| 3,524,011 | 8/1970 | Korpel | 178/5.4 |
| 3,617,750 | 11/1971 | Walker | 455/617 |
| 4,331,409 | 5/1982 | Cianci, Jr. et al. | 354/401 |

OTHER PUBLICATIONS

Eng-"An Experiment with a $CO_2$ Acoustooptic"-Optics Communications, vol. 23, No 1, Oct. 1977, pp. 139-141.
Godin-"Line of Light Links"—Electronics, Aug. 11, 1983, pp. 91, 92.
"Spurred by Deregulation"-Electronics-Oct. 6, 1983, pp 150, 151.
Gould et al,-"Coherent Detection"-Applied Optics, vol. 3, No. 5, May 1984, pp. 648, 649.

*Primary Examiner*—Joseph A. Orsino, Jr.

[57] ABSTRACT

A communications system employs a laser for producing a beam of spatially-coherent, monochromatic, aperture-limited electromagnetic optical energy. The beam is modulated with intelligence-bearing information to develop wavefronts of mutually-aligned orientation. The beam is directed through free space to impinge upon a surface reflective of the energy and exposed in a non-confined free space to the impingement of the beam. The beam is also focused upon the surface with the impingement of the beam being within the depth of focus and substantially at the waist of the region of focus of the beam. The information in the beam, as reflected by the surface at an angle thereto and with a mutually-aligned orientation of those wavefronts maintained, is detected. Finally, the information demodulated from the detection is derived and utilized.

6 Claims, 5 Drawing Figures

COMMUNICATIONS SYSTEM

The present invention relates to a communications system. More particularly, it pertains to a system for transmitting intelligence over or around an obstruction by the use of optical energy.

With the advent of the laser, various devices were soon developed for both steering and modulating information-bearing intelligence upon the beam produced by the laser. It was quickly recognized that its spatially-coherent monochromatic electromagnetic optical energy enabled its beam to carry wideband information. That is, audio, video or digital information which conveyed intelligence could be modulated upon and transmitted by means of the laser beam because of its spectral qualities. Representative of early modes of modulating and steering laser beams are U.S. Pat. Nos. 3,514,534-Korpel and 3,524,011-Korpel. A number of other devices have been developed for the purpose of either steering or modulating a laser beam. In effect, the acoustical approach adapted in those patents was a recognition of the value of what was called a "variable diffraction grating" in U.S. Pat. No. 3,431,504-Adler. Other improvements came along such as disclosed in U.S. Pat. No. 3,424,906-Korpel.

Although the transmission of information through free space in the form of light had been known since the latter part of the 19th century, there was little progress in the use of that form of information until the discovery of the laser. Various schemes for collimating a beam were devised, and various proposals were advanced for producing light which had the narrow spectral bandwidth which was known to be necessary for reducing distortion in the transmission of the information carried by the light. Indeed, there were a number of interesting approaches for such things as wireless microphones. But it was not until the development of the laser that many such schemes became practical, excepting certain fields of measurement and instrumentation wherein advantage could be taken merely of the fact of detectable light.

Now, there has been growing interest in what have sometimes been referred to as free-space, or atmospheric, optical systems. This seems to have followed the development of improved gas and solid-state lasers often designed for feeding optical-fibre systems of translation. Similar improvements have been forthcoming at the receiving end where P-I-N and avalanche photodiode receivers, using such materials as lithium-niobate and other non-linear optical materials, have been found usable to both modulate and demodulate wideband information and to implement purely photonic logic functions. Some recent history in this respect is collected at pages 91 and 92 of *Electronics* for Aug. 11, 1983 and at pages 150 and 153 of *Electronics* for Oct. 6, 1983.

Much of the development of optical transmission of intelligence has followed the experience of radio. The first techniques seemed to follow the homodyne principle, while later techniques adopted the superheterodyne principle, particularly because of the early absence of detectors that could respond above only a comparatively-low frequency. Thus, the art has progressed to the point of allowing comparatively efficient modulation and demodulation of intelligence on and from the carrier which is a beam of light that is essentially of a monochromatic nature. Coupled with all of the progress in modulators and demodulators has been the development of improved lasers in respect of the spectral purity. For carrying intelligence, the ideal laser beam would be of a single frequency, and the art is coming close. Notwithstanding this degree of development, the optical art has basically confined itself to line-of-sight transmission except in the case of fiber optics. At radio frequencies, one can bend energy off of a reflector, such as ions in the atmosphere, and bring it back to a point of reception without significant destruction of its informational content. At optical frequencies, however, an attempt at bending the path of the beam by using something like a simple mirror results in the destruction of the mutually-aligned wavefronts that carry the information modulated thereupon. That is, one wishing to transmit a wide-band modulated beam has not been able to avoid the distortion, if not destruction, of the modulated intelligence when the beam is "bent".

A general object of the present invention is to provide a new and improved communications system overcomes the foregoing deficiencies.

Another object of the present invention is to provide such a system which is capable of using a beam-bending surface that may vary somewhat in range from the point of transmission of the beam.

A further object of the present invention is to provide a system of the foregoing character which enables maintenance of the essential characteristics of the beam in order more faithfully to transmit the intelligence.

A communications system in accordance with the invention includes means for producing a beam of spatially-coherent, monochromatic, aperture-limited electromagnetic optical energy. The beam is modulated with a wideband intelligence signal of information-bearing information in order to develop wavefronts of mutually-aligned orientation. Directing the beam through free space to impinge upon a surface reflective of the energy and exposed in a non-confined free space to the impingement of the beam, the beam is focused upon that surface with the impingement of the beam being within the depth of focus and substantially at the waist of the region of focus of the beam. Then, detecting the information in the beam, as reflected by the surface, at an angle thereto and with the mutually-aligned orientation of wavefronts maintained, there are means for deriving and utilizing the information.

The foregoing and other objects of the present invention will best be understood, and additional objects and advantages will be revealed, by reference to the following more-detailed description in connection with the drawings, in which.

Figure 1:
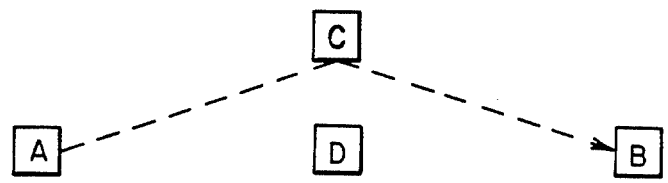
FIG. 1 is a schematic view of a representation of the purpose of the invention.

FIG. 1 illustrates the problem. It is desired to optically transmit information from a transmitter site at point A to a receiver site at point B, but point D is in the way of line-of-sight transmission. The relationship between points A, B and D may be either in the horizontal or the vertical direction. That is, point D might be a building that is located in the way or the ridge of a mountain range. In the approach to be described, the information is reflected at an intermediate site at off a point C, to one side, above or below, and then redirected by such reflection, or scattering, onto point B.

As found early by G. Gould et al, reported in *Applied Optics*, Volume 3, No. 5, May 1964, there can be coherent detection of light scattered from a diffusely reflecting surface. Thus, the surface at point C could be of that character. Obviously, more of the light would be reflected to a detection point were that surface of a specularly-reflective nature. Reflection off a movable substrate, such as a window, should be avoided because that kind of surface will be flexed by acoustical energy impinging thereon either from inside or outside.

Figure 2:
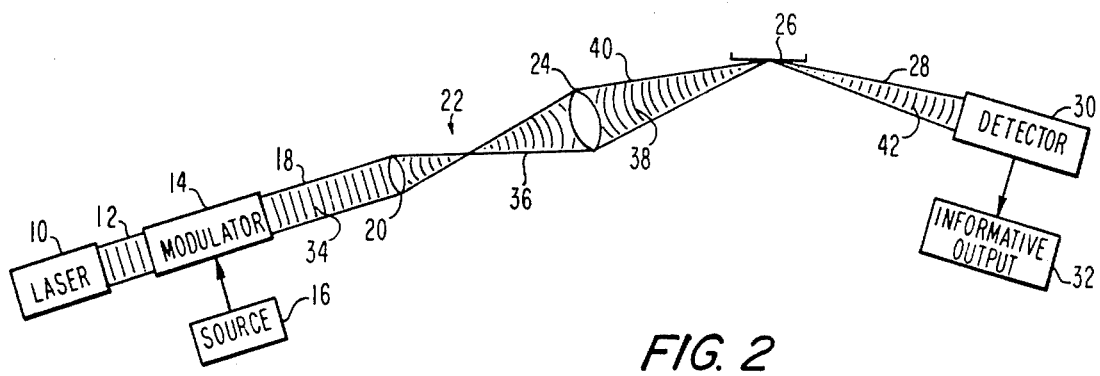
FIG. 2 is a diagrammatic view of one embodiment of the invention.

In FIG. 2, a laser 10 projects a beam 12 through a modulator 14. Beam 12 is of spatially-coherent, monochromatic electromagnetic optical energy that is aperture limited. For discussion purposes, it may be assumed that laser 10 is of a conventional variety operating at 6328 Angstroms. Modulator 14 may be a Bragg-cell device as described in several of the references mentioned in the introduction. On the other hand, it may be any of the more recent light modulators. Of course, modulator 14 is fed from a source 16 of intelligence-bearing information.

Moreover, it is known that modulator 14 may be incorporated in function within the body of laser 10. In either event, the modulated beam 18 is directed into an eyepiece 20 of a telescope 22 the output end of which includes an object lens 24.

Telescope 22 focuses the beam upon a surface 26 which is either specularly or diffusely reflective, so as to bend the energy into a beam along a path 28 to a detector 30 which yields information to an information output system 32.

Information modulated upon beam 18 creates wavefronts 34 of mutually-aligned orientation and which are, within telescope 22, converted to wavefronts 36 still having such orientation. From lens 24, the beam is caused to converge into a spot on surface 26. Beyond telescope 22, the information is carried on wavefronts 38 that still are maintained in mutually aligned orientation. Nearing surface 26, beam 40, from lens 24 to surface 26, narrows down exponentially to define a waist which is known from the optical art as being the region of focus. At the very center of that region of focus is a point of narrowest dimension. Thus, beam 40 is "focused" upon surface 26 and defines a spot of illumination thereon of comparatively small size.

Yet, that energy reflected from surface 26, as long as it is reflected from a point of focus, or near thereto, has wavefronts 42 in beam 28 which are a reciprocal of wavefronts 38 in beam 40. That is, beam reflected off of surface 26 yields the succession of the information-bearing wavefronts 42 that maintain their mutual alignment and orientation, so as to preserve the integrity of the information modulated onto the beam.

Upon impingement of beam 28 at detector 30, the modulation is either directly derived and fed to an information output system 32 or is homodyned or heterodyned in order to enable the derivation of the actual information being transmitted. Synchronized superheterodyned detection is enabled to be automatically obtained, of course, by use, for example, of the accurately-controlled frequency of a color television reference signal as produced by a local television station. Alternatively, a synchronizing signal may be included along with the intelligence modulation and conveyed by other means to detector 30. Still further, the basic carrier frequency of beam 12 may be employed for homodyne detection. Apparently preferable at the current state of the art is simply to use a non-linear detector, as mentioned in the introduction, which does not require any kind of synchronization with other information in order to access the modulated intelligence.

As indicated, telescope 22 maintains mutual wavefront alignment of the information or the beam. A properly-formed aperture-limited beam, of Gaussian distribution, will enable that. Beyond telescope 22, the beam reaches a diffraction-limited focal point having a Gaussian spot diameter of:

$$DS = \frac{4}{\pi} \frac{R\lambda}{DA},$$

where DS is the spot diameter, R is the distance from telescope 22 to surface 26, λ is the radiation wavelength and DA is the diameter of the optical aperture of telescope 22. In that area, there will be a depth of focus δ equal to:

$$\delta = \pm 3.5 \left(\frac{R}{DA}\right)^2 \lambda, \quad (2)$$

Figure 2A:
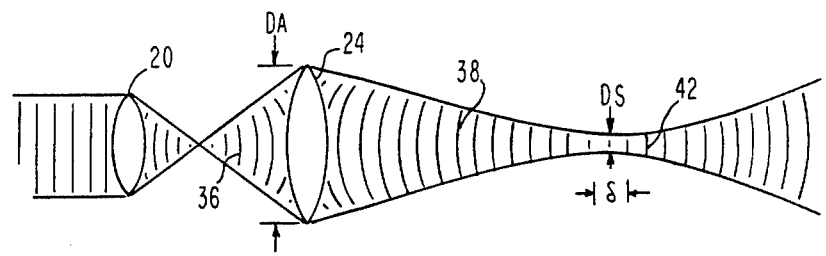
FIG. 2a is a diagrammatic view of a focal waist in a laser beam, but without the bending of such a beam as in the other figures.

DA being the optical aperture no matter how established. FIG. 2a may assist in understanding, although it does not show the beam as being bent.

Figure 3:
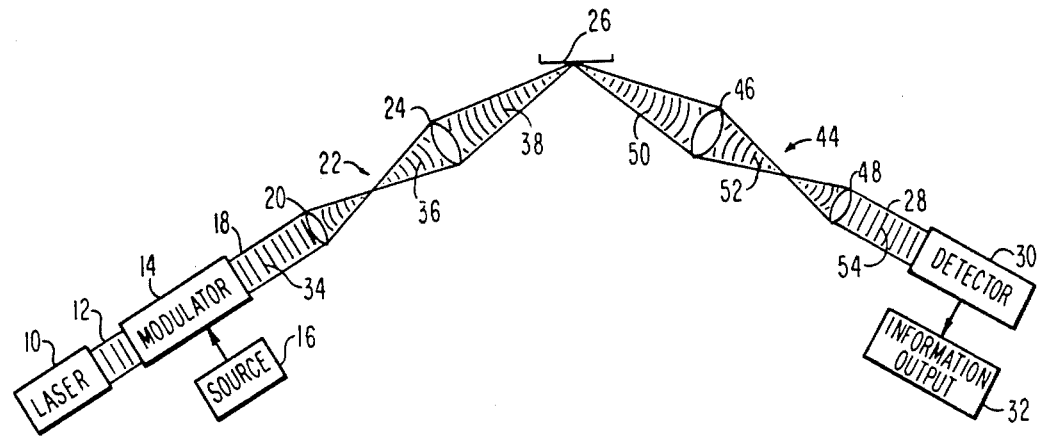
FIG. 3 is a diagrammatic view of another embodiment of the present invention.

FIG. 3 illustrates an alternative in which detector 30 is imaged upon the spot formed on surface 26 by a reversely oriented telescope 44. The system involving telescope 44 includes an object lens 46 and an eye-piece 48 at which detector 30 looks. Once more, wavefronts 50 ahead of lens 46 and wavefronts 52 between that lens and eye-piece 48 preserve the maintenance of mutually-aligned orientation of those wave fronts—in order to preserve the integrity of the information being transmitted to the detector by wavefronts 54. Telescope 44 enables detector 30 to be fed with a maximized amount of energy 30 available at the spot on surface 26, even if it is only diffusely reflected.

Figure 4:
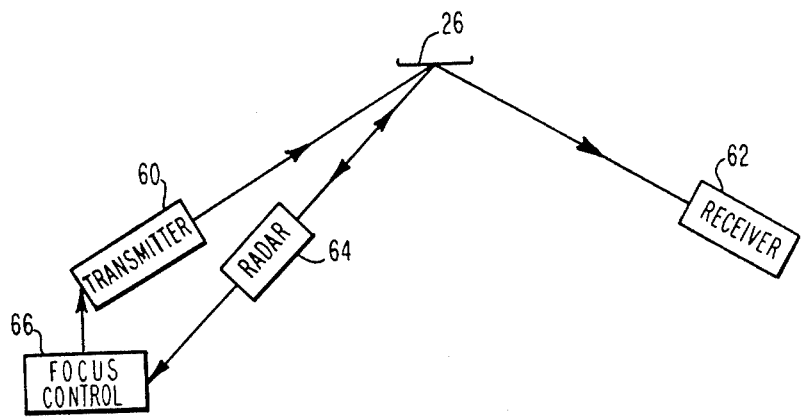
FIG. 4 is a diagrammatic view of a modification which may be employed in connection with the systems illustrated in either FIGS. 2 or 3.

The system herein presented may be used to get around intervening topography by appropriately "bouncing" the information-containing energy off a building located to one side of the direct path. It is established that tall buildings can sway quite a bit, as much as a foot or more. Because being at or very near to the waist of the focal region is inherently important to this system, it may be necessary to adjust the optical transmitter 60 as to focal length with respect to surface 26 in order to insure that a receiver 62 obtains a proper signal. As shown in FIG. 4, this is solved by employing a radar system 64 adjacent to transmitter 60 in order to obtain a determination of range from transmitter 60 to surface 26. That distance information produced by radar 64 is fed to focus-control circuitry 66 in order to adjust the focal distance of transmitter 50. Of course, transmitter 60 is the combination shown in earlier figures as including the laser, modulator and telescope.

It is important that wavefront alignment in orientation be maintained throughout the system. Otherwise, the information will become garbled by intermixing. That will occur when there is a shift in angulation of more than half a wavelength from one wavefront relative to the next. For that reason, it is a limitation that the diameter DA of any lens system ought to satisfy:

$$DA = \frac{4}{\pi} \frac{R\lambda}{DS},\qquad(3)$$

where the spot is produced by lens 24 so that the spot size DS reciprocally or automatically is:

$$DS = \frac{4}{\pi} \frac{R\lambda}{DA}.\qquad(4)$$

For simplicity in accomodating all variables, it may well be preferred that the receiving aperture be equal to the transmitting aperture. The importance of depth of focus and all other criteria in that regard becomes apparent when one looks at the signal-to-noise ratio (S/N). Basically, it is governed by the equation:

$$\frac{S}{N} = K \frac{DA^2}{R^2},\qquad(5)$$

where K is a constant.

Telescopes 22 and 34 produce gain in the overall system and provide a range gate which basically is the depth of focus. That range gate is important in that it frees the system from responding to out-of-passband signals which might be encountered, for example, by other influences that were out of the passband. To illustrate, one could transmit and receive the signal through dirty windows, but that dirt would not be seen by the optics of this system. The only thing seen by detector 30 would be what occured at surface 26, at least in the embodiment of FIG. 3. Being responsive only to a limited frequency range, detector 30 would not usually respond to any other interference as might be present in the case of the simpler embodiment of FIG. 2.

It is the ratio of R/D that counts most. Practical figures reveal that, at a range of one-thousand meters to the reflector, there might be a tolerance of ten feet in the location of the reflector. If the range is, for example, equal to a thousand times the aperture diameter, the depth of focus may be about ten feet. In practice, however, it is desired to maintain the tolerance as close as possible in order to maintain a good signal-to-noise ratio.

As will be apparent, the distribution of the different elements may be modified. For example, a modulated laser might be employed which inherently produced a beam already not only collimated but focused so as to impinge upon surface 26 as a spot within the region of focus. Similarly, detector 30 might be so constructed as to look only to a very small area of a target toward which it was poised.

When reference has been made above to reflectors, that will, of course, include prisms and other refractive devices. As embodied, the system might also use spatial filtering, as is conventionally known, to increase the signal-to-noise ratio. Many other techniques, now known to the optical-transmission art, are capable of being advantageously employed as additions to the system described. What has been described is a system of maintaining coherence of the information transmitted by optical energy, notwithstanding its being forced to be bent in direction of travel.

While particular embodiments of the present invention have been shown and described, it will be obvious to a person skilled in the art that various changes and modifications or alternatives may be employed. Accordingly, the following claims, while directed to the spirit and scope of the invention, seek to define that which is believed to be patentable.

I claim:

1. A communication system for transmitting intelligence from a transmitter site through non-confined free space to an intermediate site remote from said transmitter site and receiving said intelligence from said intermediate site at a receiver site further remote and physically separate from said transmitter site and separated from said intermediate site by non-confined free space, said system comprising:
   means at said transmitter site for producing a beam of spatially-coherent monochromatic, aperture-limited electromagnetic optical energy;
   means for modulating said beam with intelligence-bearing information to develop wavefronts of mutually-aligned orientation;
   means for directing said beam from said transmitter site through said space to impinge upon a surface at said intermediate site, said surface being reflective of said energy and exposed in said space to the impingement of said beam;
   means also at said transmitter site for focusing said beam upon said surface, the impingement of said beam being within the depth of focus and substantially at the waist of the region of said focus of beam;
   means at said receiver site for detecting said information in said beam as reflected by said surface and at an angle thereto and with the mutually-aligned orientation of said wavefronts maintained; and
   means for deriving said information demodulated from said detecting means.

2. A communications system as defined in claim 1, wherein said beam is focused to a diffraction-limited Gaussian spot having a depth of focus $$\delta = \pm 3.5 \left(\frac{R}{D}\right)^2 \lambda,$$

where $\lambda$ is the wavelength of the radiation, R is the distance from said focusing means to said surface, $\delta$ is the depth of focus and D is the diameter of the optical aperture.

3. A communication system as defined in claim 1 in which said detecting means includes means for imaging upon the detector said energy as focused upon the spot formed by said beam on said surface.

4. A communications system as defined in claim 1, wherein said focusing means defines a spot on said surface that has a spot diameter Ds of $$DS = \frac{R\lambda}{DA},$$

wherein $\lambda$ is the wavelength of radiation, R is the distance from said focusing means to said surface and DA is the diameter of the optical aperture of said focusing means.

5. A communications system as defined in claim 4, wherein said spot diameter is:

$$DS = \frac{4}{\pi} \frac{R\lambda}{DA},$$

6. A communications system comprising:

means for producing a beam of spatially-coherent, monochromatic, aperture-limited electromagnetic optical energy;

means for modulating said beam with intelligence-bearing information to develop wavefronts of mutually-aligned orientation;

means for directing said beam through free space to impinge upon a surface reflective of said energy and exposed in a non-confined free space to the impingement of said beam;

means for focusing said beam upon said surface, the impingement of said beam being within the depth of focus and substantially at the waist of the region of said focus of said beam;

means for detecting said information in said beam as reflected by said surface and at an angle thereto and with the mutually-aligned oriention of said wavefronts maintained;

means for deriving and utilizing said information demodulated from said detecting means;

means for determining the range between said focusing means and said surface and developing a signal indicative of said range;

and means responsive to said signal for adjusting said focusing means.

* * * * *